(12) United States Patent
Ha

(10) Patent No.: US 10,943,368 B1
(45) Date of Patent: Mar. 9, 2021

(54) CAMERA CALIBRATION SYSTEM

(71) Applicant: Aurora Innovation, Inc., Palo Alto, CA (US)

(72) Inventor: Yonggang Ha, Palo Alto, CA (US)

(73) Assignee: Aurora Innovation, Inc., Palo Alto, CA (US)

( * ) Notice: Subject to any disclaimer, the term of this patent is extended or adjusted under 35 U.S.C. 154(b) by 0 days.

(21) Appl. No.: 16/725,325

(22) Filed: Dec. 23, 2019

Related U.S. Application Data

(60) Provisional application No. 62/833,123, filed on Apr. 12, 2019.

(51) Int. Cl.
| | |
|---|---|
| *G06T 7/80* | (2017.01) |
| *G06T 7/70* | (2017.01) |
| *G06T 1/60* | (2006.01) |
| *H04N 17/00* | (2006.01) |
| *B60R 1/00* | (2006.01) |

(52) U.S. Cl.
CPC .................. *G06T 7/80* (2017.01); *G06T 1/60* (2013.01); *H04N 17/002* (2013.01); *B60R 1/00* (2013.01); *B60R 2300/304* (2013.01)

(58) Field of Classification Search
CPC ..................................... G06T 7/80; G06T 7/70
USPC ......................................................... 348/148
See application file for complete search history.

(56) References Cited

U.S. PATENT DOCUMENTS 6,285,799 B1 * 9/2001 Dance .................. H04N 17/002
                                                              382/260

\* cited by examiner

*Primary Examiner* — Jeffery A Williams
(74) *Attorney, Agent, or Firm* — Middleton Reutlinger

(57) ABSTRACT

Implementations set forth herein relate to a camera calibration system for generating various types of calibration data by maneuvering a camera through a variety of different calibration test systems. The calibration data generated by the camera calibration system can be transmitted to the camera, which can locally store the calibration data. The calibration data can include spatial frequency response value data, which can be generated according to a spatial frequency response test that is performed by the camera calibration system. The calibration data can also include field of view values and distortion values that are generated according to a distortion test that is also performed by the camera calibration system. The camera calibration system can maneuver the camera through a variety of different calibration tests, as well as transmit any resulting calibration data to the camera for storage.

20 Claims, 6 Drawing Sheets

CAMERA CALIBRATION SYSTEM

TECHNICAL FIELD

Implementations described herein relate to camera calibration systems. Specifically, the implementations include systems, methods, and apparatuses for generating data during calibration of a camera and storing the generated data in a local memory of the camera.

BACKGROUND

Cameras can be calibrated according to various techniques in order to ensure cameras are operational according to certain specifications. When a camera is identified by the manufacturer as not being operational according to such specifications, some manufacturers may elect to repair and/or recycle the camera. In many instances, a camera may pass particular tests, but nonetheless exhibit slight differences in operating characteristics relative to other cameras that have also passed such particular tests. As a result, systems that rely on the cameras for image recognition and/or other image-based processes can exhibit varying degrees of accuracy, which can cause downstream issues when such systems make decisions regarding energy consumption, safety, and/or efficiency. For instance, a fleet of autonomous vehicles that relies on similar cameras and common navigation software across the fleet of vehicles can exhibit varying operational characteristics when each camera performs differently during calibration. As a result of such variations, certain autonomous vehicles may react differently to similar environmental conditions, which can lead to differences in how adequately vehicles learn to respond to such conditions.

SUMMARY

As computer vision becomes heavily relied upon for tasks of autonomous devices, such as autonomous vehicles, camera calibration can become pivotal to device performance and efficiency. For example, a camera operating with well-calibrated parameters can provide output that can be relied upon to generate more accurate estimates of distance, object features, object speed and/or acceleration, and/or any other property that can be deduced from an image. During, and/or after, manufacturing of a camera, the camera can undergo a variety of different tests in order to calibrate the camera. Various parameters derived from one or more calibration tests can be stored within one or more memory devices of the camera. The stored parameters can thereafter be used by a third party, such as a supplier of autonomous vehicles, as a basis for adjusting certain operational characteristics according to the derived parameters.

In some implementations, a camera can undergo a series of calibration tests that include a spatial frequency response (SFR) and/or a modulation transfer function (MTF) test, for resolving spatial details of incoming optical data. Furthermore, the series of calibration test can include a distortion test that uses a calibration target for generating intrinsic parameters for the camera, such as focal length, distortion centers, and/or distortion coefficients. The series of calibration tests can also include a shading and/or color test, which can employ a static and/or dynamic array of colors and/or shades. The array of colors and/or shades can be presented at a surface, which can be captured by camera and subsequently compared with a stored profile in order to determine suitable color parameters for calibrating the camera.

Cameras that are used to capture images while in motion can undergo a boresight test, which can also be incorporated into the series of calibration test. By undergoing the boresight test, features of camera position, such as pitch, yaw, and roll, can be compared to a mechanical datum during calibration, at least for providing accurate calibration parameters. In some implementations, a mechanical datum can represent a reference point. For example, a particular portion of a camera can be a mechanical datum to be a reference point for the comparison described above. Other calibration tests that can be included in the series of calibration tests can include a verification test for confirming certain performance features of the camera. For example, when undergoing the series of calibration tests, a camera can undergo an ingress protection test, a thermal performance test, and/or a flare and ghost test. Ingress protection test can include sampling one or more locations of the camera to determine whether particle ingress is occurring as a result of the camera being exposed to one or more different environments. The thermal performance test can include operating a camera within a thermal chamber and characterizing operational performance of one or more subsystems of the camera when exposed to temperatures. The flare and ghost tests can measure a susceptibility of a camera to lens flare, which can be caused by reflections between lenses of a camera, and ghost images, which can be caused by a loss of shadow and/or color for corresponding portions of an image.

Subjecting a camera to the aforementioned series of calibration tests can generate a variety of different data which can be used by other systems that rely on the camera for various operations. Such data can be at one or more memory devices of a camera during and/or after the series of calibration tests have completed. Furthermore, other data relied upon or otherwise generated from the calibration tests can be stored within the memory of the camera and/or provided as feedback to a camera test system that is tasked with calibrating one or more different cameras, and/or a manufacturing system that is tasked with manufacturing cameras and/or similar devices. Some examples of calibration data that can be available to the camera test system and/or stored with a camera that has undergone the series of calibration tests can include illumination center coordinates, distortion focal length, distortion center coordinates, distortion coefficients, boresight roll, pitch, and/or yaw, lens shading data, and/or SFR testing data for one or more frequencies. Calibration data can be used by the camera test system and/or manufacturing system to make adjustments to parameters that are established for subsequently manufacturing and/or testing other cameras. For instance, camera position data derived from a camera boresight test can be subsequently used by the manufacturing system and/or the camera test system to make adjustments to positioning of the camera during manufacturing and/or calibration tests, such as a subsequent boresight test, distortion test, SFR/MTF test, lens and color shading test, and/or any other calibration test that can be performed on a camera.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
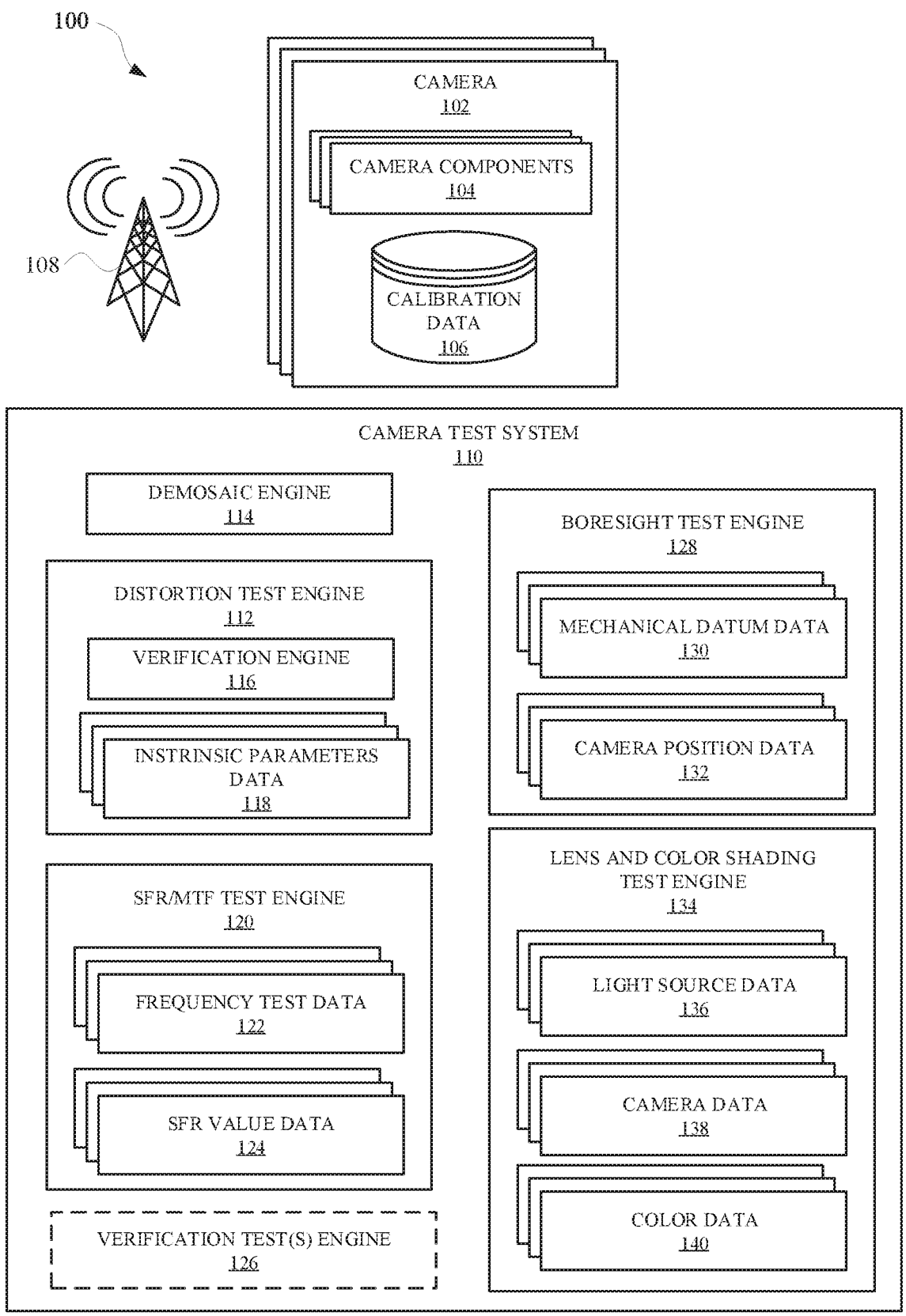
FIG. 1 illustrates a system for generating calibration data and storing the calibration data in memory of a camera.

FIG. 1 illustrates a system 104 for generating calibration data and storing the calibration data in memory of a camera. The system 100 can be embodied as one or more devices, applications, and/or any other apparatus or module capable of interacting with a camera. The system 100 can include a camera test system 110 that is in communication with one or more cameras 102. Each camera 102 of the one or more cameras 102 can include camera components 104, such as one or more lenses, processors, memory devices, and/or any other components that can be part of a camera. Memory of the camera 102 can store calibration data 106, which can be generated by the camera test system 110 and communicated to the camera 102 over a network 108 such as the internet, a local area network (LAN), wide area network (WAN), a P2P connection, a Bluetooth connection, and/or any other network over which computing devices can communicate.

Figure 3:
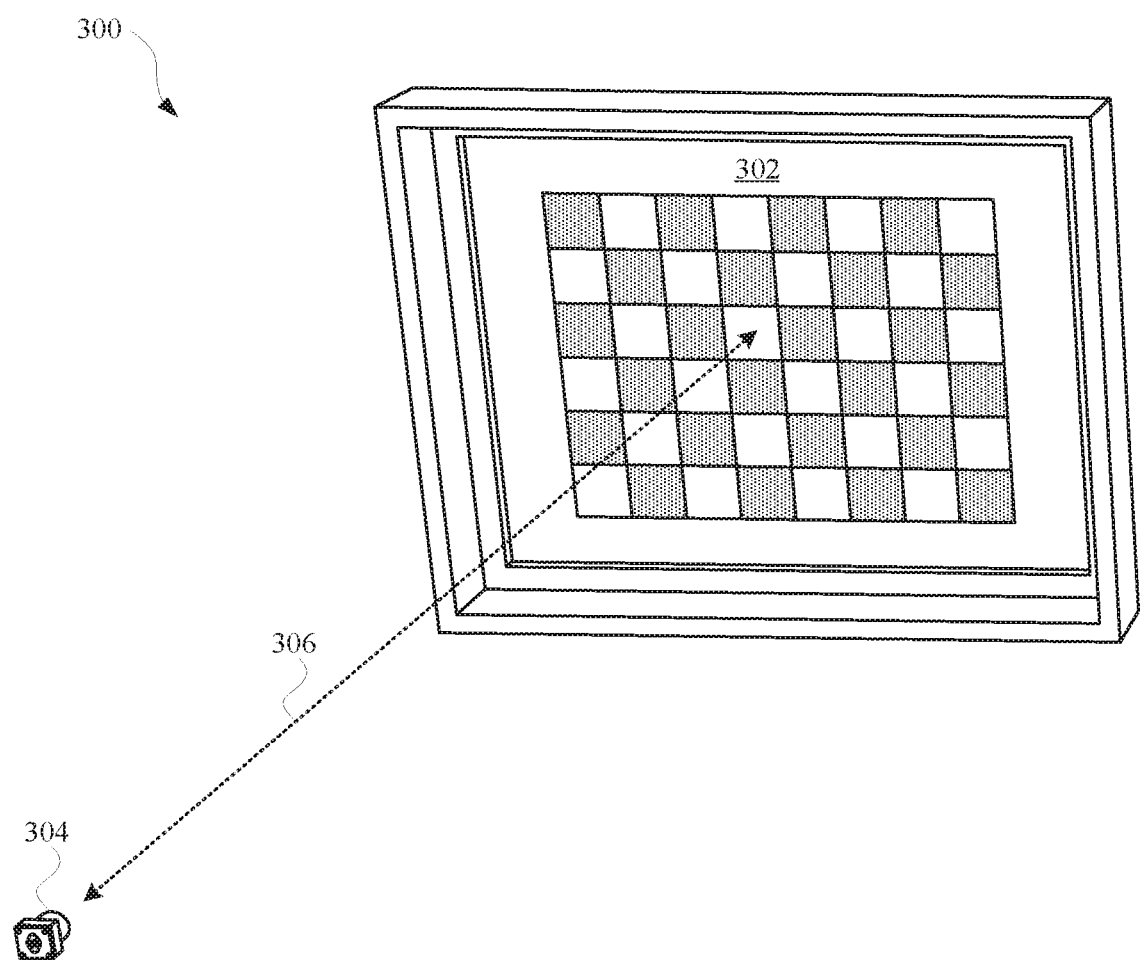
FIG. 3 illustrates a view of camera distortion test system that employs a checkerboard test target.

The camera test system 110 can control the camera 102 using data transmitted over the network 108, in furtherance of generating the calibration data 106. For example, the camera test system 110 can include a distortion test engine 112, which can control the camera 102 in furtherance of causing the camera 102 to undergo a distortion test. The distortion test can be performed by the camera test system 110 in order to obtain intrinsic camera parameters for a particular camera 102 that is undergoing the testing. Such intrinsic camera parameters can include, but are not limited to, focal length, distortion centers, distortion coefficients, horizontal field of view, vertical field of view, and/or any other parameter that can be derived based on a distortion test. In some implementations, the camera test system 110 can include data and/or an apparatus characterizing a checkerboard (e.g., see view 300 of checkerboard 302 of FIG. 3) or a dot chart (e.g., see view 400 of dot chart 402 of FIG. 4), which can be captured by the camera (e.g., camera 304 or camera 404) as one or more images. The images can be processed by a de-mosaic engine 114, and resulting image data can be processed via a verification engine 116. In some implementations, a narrow field of view camera can be tested by the distortion test engine 112 using multiple different charts at different positions. Intrinsic parameters data 118 can be generated by the verification engine 116 and provided to the camera 102 and/or be further processed at the camera test system 110. In some implementations, normal camera model distortion coefficients can be generated and stored with the calibration data 106, and/or fish eye camera model distortion coefficients can be generated and stored at the calibration data 106.

Figure 4:
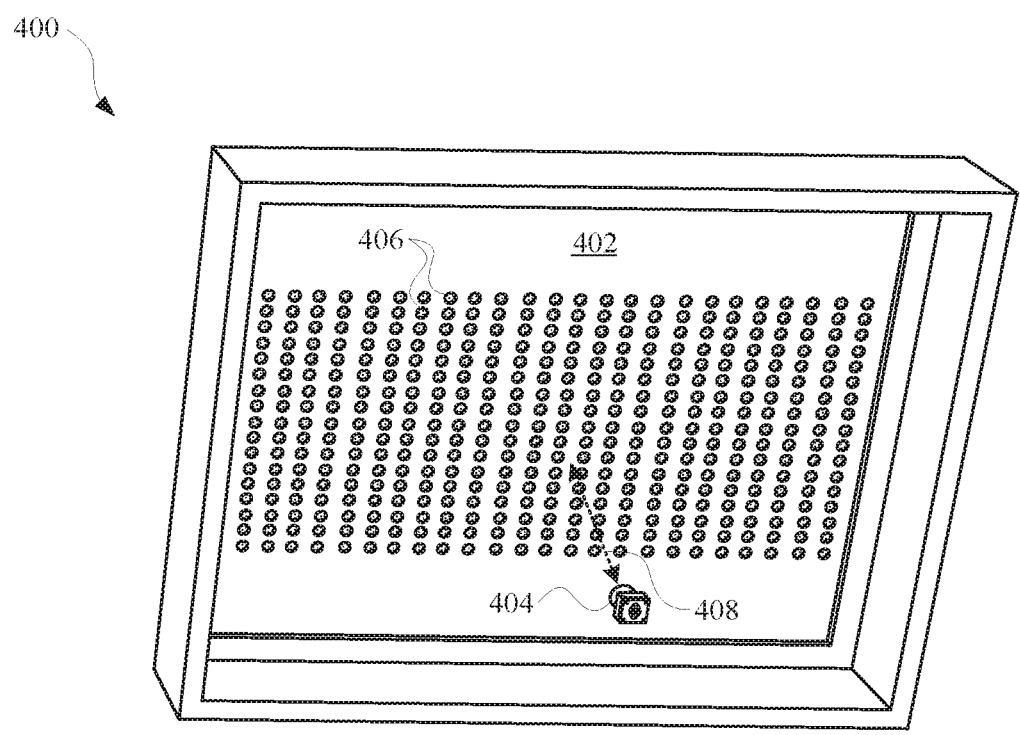
FIG. 4 illustrates a view of a camera distortion test system that employs a dot chart test target.

In some implementations, with reference to FIGS. 1 and 4, the distortion test engine 112 can cause the camera 102 (e.g., camera 404) to capture one or more images of a dot chart 402 that is disposed over a backlit panel. For example, raw images of the chart can be processed in order to de-mosaic the raw images, thereby reconstructing color images, which can thereafter be processed in order to generate the intrinsic values. In some implementations, blob detection can be used to find a centroid of each dot 406 of the dot chart 402. One or more blob detection algorithms can be performed in order to identify each centroid. Locations of each centroid can be used to determine K and D values, which can refer to image matrix values ("K") and a linear and/or non-linear distortion coefficient ("D"). Based on the K and D values, horizontal field of view and vertical field of view can be calculated.

With reference to FIG. 4, by employing the dot chart 402 when performing the distortion test, the camera 404 can be positioned at a distance 408 from the dot chart 402. Comparing the distance 408 to a distance 306 in FIG. 3, the distance 408 is shorter than the distance 306 such that a distortion test can be performed in a compact arrangement illustrated in FIG. 4. This compact arrangement of the dot chart distortion test can therefore provide for more efficiency during a testing processing, in which the camera 404 may be maneuvered between varieties of different testing apparatuses. Therefore, production can be expedited, thereby leading to reduced manufacturing times and costs. Furthermore, the dot chart calibration process can provide more accurate calibration results relative to the checkerboard calibration.

Referring back to FIG. 1, in some implementations, the camera test system 110 can include an SFR/MTF test engine 120. SFR/MTF test engine 120 can be used to generate SFR value data 124, which can be provided to the camera 102 as further calibration data 106. In order to calculate the SFR values, digital images of one or more slanted edge charts (e.g., a test target having one or more straight slanted shapes, relative to a horizontal and/or vertical references axis) and/or other test charts can be captured. In some implementations, MTF/SFR can be tested for a camera using collimated crosshair targets and/or other test targets using collimator lenses. Furthermore, specific field of viewpoints can be tested, such as tangential and sagittal MTF/SFR at a location at a center of the field of view or image height, tangential and sagittal MTF/SFR at 4 locations at halfway points of the field of view or image height, and/or tangential and/or sagittal MTF/SFR at 4 locations corresponding to any other fraction of a field of view or image height. The digital images can be processed using the de-mosaic engine 114, and subsequently converted into monochrome format. In some implementations, the SFR chart and/or other test chart can be repositioned by the camera test system 110 based on field of view values determined by the camera test system 110. For example, when the horizontal field of view values and/or the vertical field of view values correspond to a narrow field of view camera, or a wide field-of-view camera, a distance of the chart from the camera can be adjusted electromechanically by the camera test system 110.

Once the digital images have been captured and converted to monochrome format, edge detection can be performed, and an edge spread function can be generated. A first derivative of the edge spread function can be calculated and used to generate a line spread function. Furthermore, in order to obtain the SFR value data 124, a Fourier transform of the line spread function can be for one or more frequencies and/or a range of frequencies (e.g., Nyquist frequency, Nyquist frequency/2, and/or any other frequency value(s)), which can be characterized by frequency test data 122.

Figure 5:
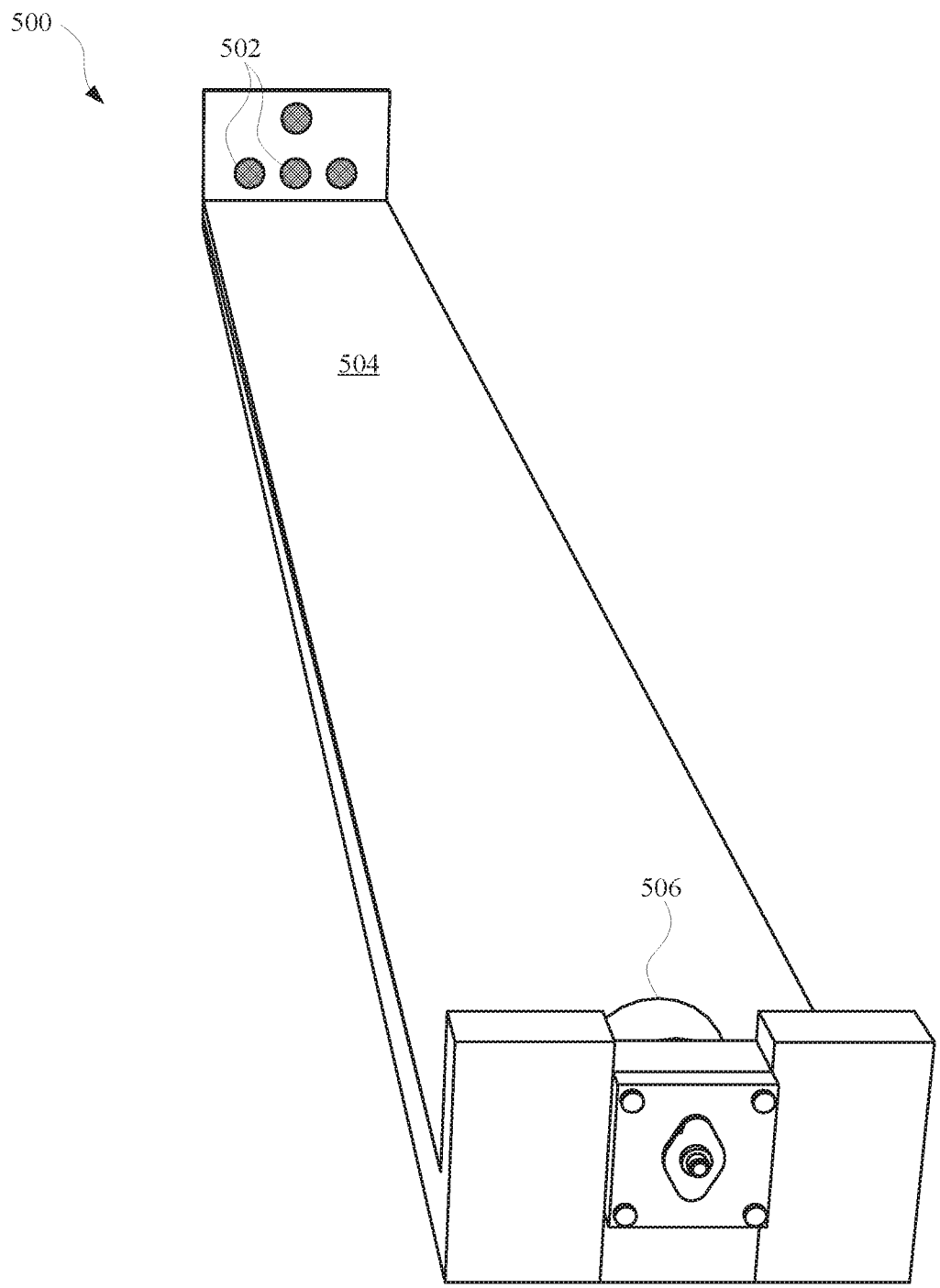
FIG. 5 illustrates a view of a boresight test system for a camera.

In some implementations, the camera test system 110 can include a boresight test engine 128 for generating camera position data 132 corresponding to a boresight of the camera 102. The boresight test engine 128 can be in communication with the camera 102, and determine mechanical datum data 130 corresponding to the camera 102. The mechanical datum data 130 can characterize default and/or original positioning of the camera 102. In some implementations, with reference to FIG. 5, the mechanical datum can correspond to mounting holes and/or mounting fixtures of a camera, such as the camera 506, as illustrated in view 500. With reference to FIGS. 1 and 5, the boresight test engine 128 can cause the camera 102 (e.g., camera 506) to capture images of one or more test targets 502, in order to generate camera position data 132. The camera position data 132 can then be provided to the camera 102 and stored as calibration data 106, and/or provided to an active alignment (AA) machine to minimize error of subsequently manufactured cameras. In some implementations, the camera position data 132, derived using the boresight test system depicted in FIG. 5, can characterize an offset from an optical axis of the camera 506 relative to a mechanical datum of the camera. In some implementations, a mechanical datum can represent a reference point. A particular portion of a camera can be a mechanical datum to be a reference point such that features of camera position (e.g., pitch, yaw, and roll) can be compared to the mechanical datum. For example, a mechanical datum can include a hole, fixture, or other mounting apparatus that is part of the camera 506.

In some implementations, the camera test system 110 can maneuver the camera 102, using one or more servos, one or more mechanical devices, and/or one or more other electromechanical devices. In some other implementations, the camera test system 110 can allow a user to maneuver the camera 102. For example, a user can maneuver the camera 102 using one or more servos, one or more mechanical devices, and/or one or more electromechanical devices. The camera 102 can be maneuvered into position at a mount 504 of a boresight test target. The test target can include dot test targets 502 disposed along a nominal optical axis, and/or one or more other dot test targets 502 disposed along an x-axis and/or a y-axis. In some implementations, collimated beams can be used to provide the dot targets at the boresight test target. Images captured by the camera 102 (e.g., camera 506) can be processed by the boresight test engine 128 in order to identify centroids corresponding to the dot test targets 502.

Comparisons between locations of the centroids of the dot targets and the mechanical datum data 130 can be used to determine pitch, yaw, and roll of the boresight of the camera 102. For instance, pitch, yaw, and roll can be generated from comparisons between measured positions of the dot targets, via the digital images, and expected positions of the dot targets determined based on physical features of boresight test target. Therefore, differences between the measured positions and the expected positions can influence the values for pitch, yaw, and roll, which can be characterized by camera position data 132 and stored at the camera 102 as part of the calibration data 106. Additionally, or alternatively, camera position data 132 can be available to the camera test system 110 and/or a camera manufacturing system subsequent to a boresight test of a camera in order to make adjustments to other calibration tests and/or manufacturing processes for that camera. Additionally, or alternatively, camera position data 132 can be available to the camera test system 110 subsequent to the boresight test of the camera in order to make adjustments to any calibration tests for another camera. As an example, a first camera can undergo a boresight test, using the boresight test system illustrated in FIG. 5, in order to generate camera position data 132, and the camera position data 132 can be stored at the first camera and the camera test system 110. The camera position data 132 can thereafter be used by the distortion test engine 120, the SFR/MTF test engine 120, and/or the lens and color shading test engine 134 in order to make adjustments to tests performed by each respective test engine. Additionally, or alternatively, the camera position data 132 can be used by the camera test system 110 and/or a camera manufacturing system in order to make adjustments to a manufacturing process and/or test process that is being performed on another camera. In this way, the camera test system 110 and/or manufacturing system can eliminate errors by incorporating a feedback loop that is based on data generated by one or more test engines during calibration of one or more cameras.

The camera test system 110 can further include a lens and color shading test engine 134, which can use generated camera data 138 and light source data 136 to generate color data 140, which can be stored at the camera 102 as calibration data 106. The light source data 136 can characterize features of a particular light source that is aimed at a target, such as a white, glass diffused board, dome, mushroom, and/or any other shape of glass. One or more images can be captured by the camera 102 of the target, when the light source is projecting onto the target at a particular color temperature. Color temperature data, and/or any other properties of the light source, can be characterized by the light source data 136. Furthermore, when one or more images are collected by the camera 102, the camera data 138 (which can include the collected images) along with the light source data 136 can be processed to determine color coefficients, which can be stored as color data 140.

For example, the camera data 138 can correspond to images that are divided into M×N pixels, and values for pixels at a center of each M×10 (e.g., M-by-10, and/or any other M-by-R region where "M" and "R" are any of the same or different whole number integers) pixel group can be determined. The values for the pixels at the center of each group can correspond to R, Cr, Cb, and B pixels, and their values can be used to derive auto white balance (AWB) data. For instance, summations of certain values can be processed to generate average pixel values at the center of each group. The averages can be converted into fractional value such as R/C, B/C, and Cr/Cb, which can be characterized by the color data 140. In some implementations, the color data 140 can characterize fractional averages corresponding to one or more different color temperatures (e.g., values at 6500K and values at 2700K, and/or any other selection of color temperature(s)). Furthermore, the color data 140 can characterize the color data 140 can be provided to the camera 102 by the camera test system 110, thereby allowing the camera 102 to store camera specific auto white balance data. The auto white balance data can thereafter be used by an entity employing the camera 102 to collect real-time data, such as in implementations involving autonomous vehicles. The auto white balance data can eliminate inaccuracies corresponding to differences in white balance of actual objects in an environment compared to images of such objects captured by the camera 102.

In some implementations, the camera test system 110 can optionally include one or more verification test(s) engines 126. For example, the verification test engine 126 can control an ingress protection test and/or thermal test, in which the camera 102 is maneuvered into a position where the camera 102 is subject to one or more different environmental conditions, such as moisture, heat, and/or any other environmental condition. For example, during an ingress protection test, the camera test system 110 can maneuver at the camera of 102, and cause the camera 102 to be contacted with water and/or any other liquid or vapor. In some implementations, the verification test engine 126 can control a flare and ghost test, which can be performed by maneuvering the camera 102 toward a step chart that includes various shades of white and black. Alternatively, or additionally, images of the step chart and/or other arrangements of black and white areas, can be captured and processed to determine whether flare and ghost artifacts appear in the images. For example, flare and/or ghost artifacts can be characterized by percentage values that correspond to an amount of white or dark light overlapping areas that should not be white or dark.

Figure 2:
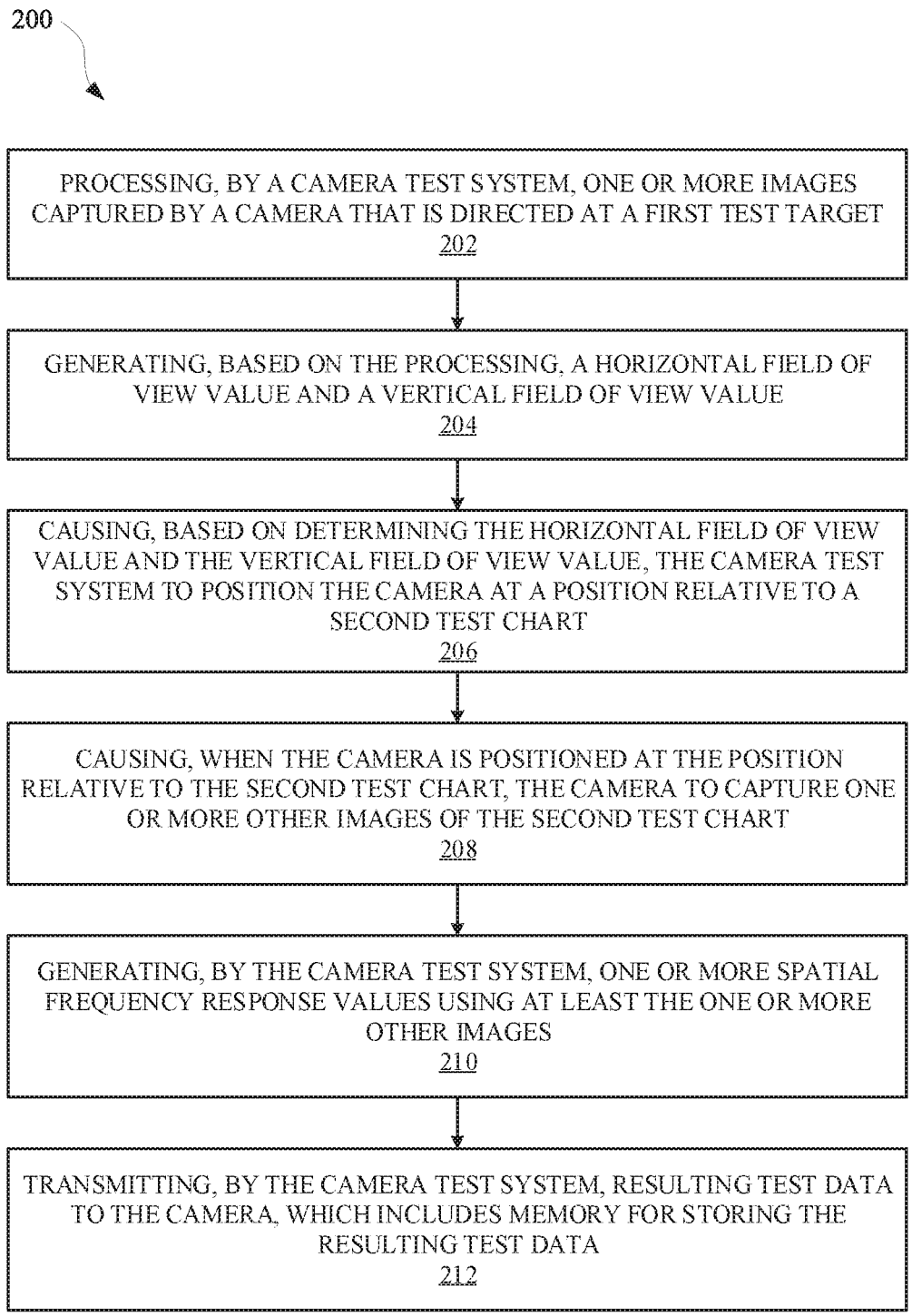
FIG. 2 illustrates a method for calibrating one or more cameras using a camera test system according to some implementations discussed herein.

FIG. 2 illustrates a method 200 for calibrating one or more cameras using a camera test system according to some implementations discussed herein. The method 200 can be performed by one or more computing devices, applications, and/or any other apparatus or module capable of interacting with a camera. As shown in FIG. 2, the method 200 can include an operation 202, which can involve the camera test system processing one or more images captured by a camera that is directed at a first test target. The first test target can be, for example, a dot chart and/or a checkerboard for testing distortion of the camera. The method 200 can further include an operation 204, which can involve the camera test system generating, based on the processing at operation 202, a horizontal field of view value and a vertical field of view value. In some implementations, the operation 204 can further include generating values characterizing linear and/or non-linear distortion exhibited by the camera.

The method 200 can further include an operation 206, which can involve the camera test system causing, based on determining the horizontal field of view value and the vertical field of view value, the camera test system to position the camera at a position relative to a second test chart. The second test chart can be, for example, a spatial frequency response test chart that includes one or more shapes that includes one or more straight edges that are slanted relative to a horizontal and/or vertical axis of the spatial frequency response test chart. The method 200 can further include an operation 208, which can involve the camera test system causing, when the camera is positioned at the position relative to the second test chart, the camera to capture one or more other images of the second test chart. In some implementations, the one or more other images can be digital images that have undergone a de-mosaic process and been converted to monochrome format.

The method 200 can further include an operation 210, which can involve the camera test system generating one or more spatial frequency response values using at least the one or more other images. The one or more spatial frequency response values can be calculated by, at least in part, generating an edge spread function for the one or more other images, processing a derivative of the edge spread function, and processing a Fourier transform of the derivative function (i.e., a line spread function) in order to determine the one or more spatial frequency response values. In some implementations, the method 200 can also include an operation 212, which can involve the camera test system transmitting the horizontal field of view value, the vertical field of view value, and the one or more spatial frequency response values to the camera. The camera can receive the transmitted values, and store them in a local memory of the camera. In this way, another entity, separate from an entity that controls the camera test system, can access the transmitted values and use the transmitted values in order to adjust certain parameters (e.g., settings for navigation of an autonomous vehicle) that rely on the camera.

Figure 6:
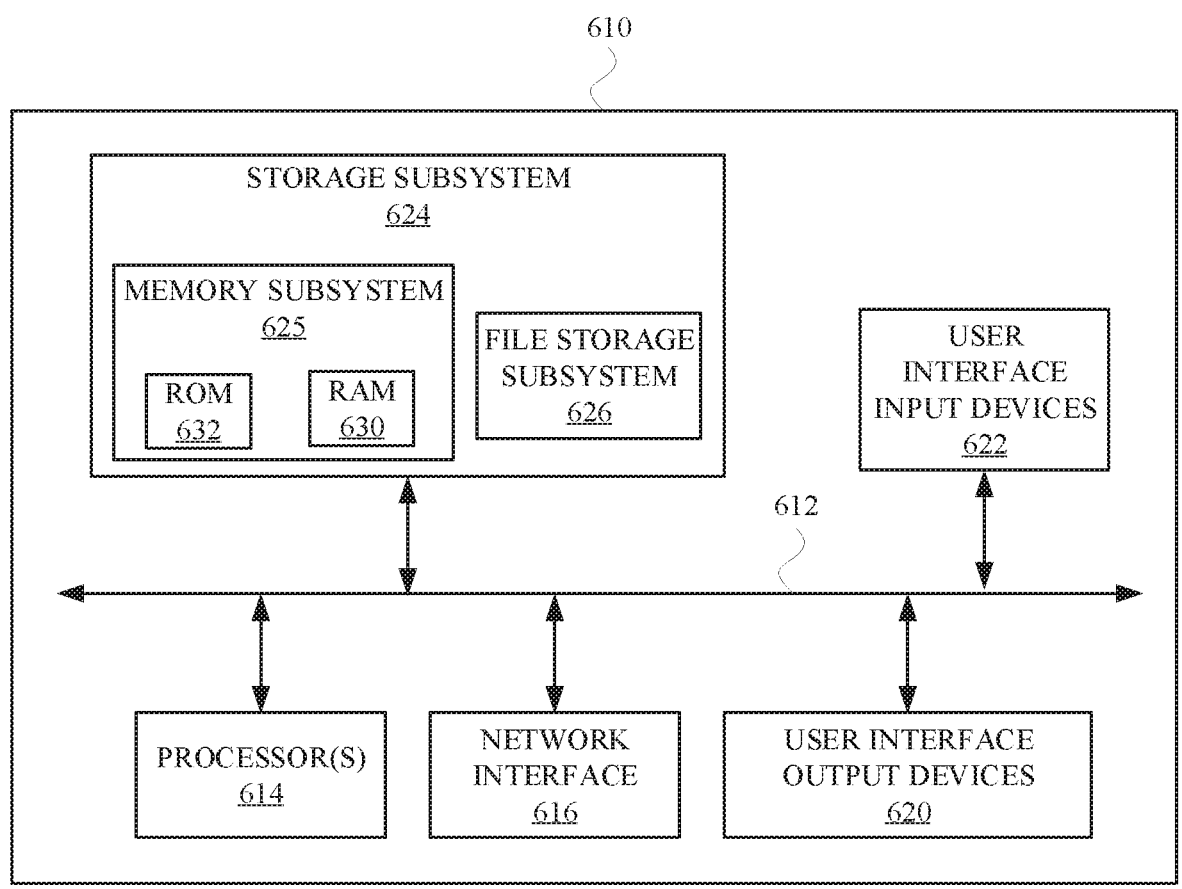
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 having both ROM 632 and RAM 630 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 200, and/or to implement one or more of the system 200, the camera test system 110, the de-mosaic engine 114, the distortion engine 112, the boresight test engine 128, the SFR/MTF test engine 120, the lens and color shading test engine 134, and/or the verification test(s) engine 126.

These software modules are generally executed by processor 614 alone or in combination with other processors. Memory 625 used in the storage subsystem 624 can include a number of memories including a main random access memory (ram) 630 for storage of instructions and data during program execution and a read only memory (rom) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges.

The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as processing, by a camera test system, one or more images captured by a camera that is directed at a first test target. The method can further include generating, based on the processing, a horizontal field of view value that characterizes a horizontal field of view of the camera and a vertical field of view value that characterizes a vertical field of view of the camera. The method can further include causing, based on determining the horizontal field of view value and the vertical field of view value, the camera test system to position the camera at a position relative to a second test chart. The method can further include causing, when the camera is positioned at the position relative to the second test chart, the camera to capture one or more other images of the second test chart; generating, by the camera test system, one or more spatial frequency response values using at least the one or more other images of the second test chart; and transmitting, by the camera test system, the horizontal field of view value, the vertical field of view value, and the one or more spatial frequency response values to the camera, wherein the camera includes memory that stores data characterizing the horizontal field of view value, the vertical field of view value, and the one or more spatial frequency response values.

In some implementations, determining the horizontal field of view value and the vertical field of view value includes performing a de-mosaic operation on the one or images captured by the camera when the camera is directed at the first test target. In some implementations, determining the horizontal field of view value and the vertical field of view value includes determining a non-linear distortion coefficient using the one or images captured by the camera when the camera is directed at the first test target. In some implementations, the first test target includes one or patterns of a plurality of dot shapes and the second test target includes shapes that are straight and slanted relative to a horizontal axis of the second test target. In some implementations, the method can further include causing the camera test system to position the camera at another position relative to a third test target that includes a surface onto which collimated beams of light are projecting; and causing, when the camera is positioned at the other position relative to the third test target, the camera to capture one or more particular images of the surface onto which the collimated beams of light are projecting.

In some implementations, the method can further include generating, based on the one or more particular images, boresight data characterizing pitch, roll, and yaw of a boresight of the camera; and transmitting the boresight data to the camera, wherein the data stored by the camera includes the boresight data. In some implementations, the method can further include causing the camera test system to position the camera at a particular position relative to a white light diffusing surface, which includes a layer of white material configured to diffuse white light that is projected onto the white material; and causing, when the camera is at the particular position relative to the white light diffusing surface, the camera to capture one or more particular images of the white light diffusing surface. In some implementations, the method can further include generating, based on the one or more particular images of the white light diffusing surface, auto-white balance data that corresponds to one or more ratios of pixel values of a portion of at least one image of the one or more particular images; and transmitting the auto-white balance data to the camera, wherein the data stored by the camera includes the auto-white balance data.

In some implementations, the method can further include causing the camera test system to position the camera at a particular position relative to at least one test system selected from an ingress protection test system, a flare and ghost test system, and a thermal protection test system; generating verification data based on at least an operation of the at least one test system; and transmitting the verification data to the camera, wherein the data stored by the camera includes the verification data.

In some implementations, a system is set forth as include one or more processors, and memory storing instructions that, when executed by the one or more processors, cause the one or more processors to perform operations that include: processing, by a camera test system, one or more images captured by a camera that is directed at a first test target; generating, based on the processing, a horizontal field of view value that characterizes a horizontal field of view of the camera and a vertical field of view value that characterizes a vertical field of view of the camera; causing, based on determining the horizontal field of view value and the vertical field of view value, the camera test system to position the camera at a position relative to a second test chart; causing, when the camera is positioned at the position relative to the second test chart, the camera to capture one or more other images of the second test chart; generating, by the camera test system, one or more spatial frequency response values using at least the one or more other images of the second test chart; and transmitting, by the camera test system, the horizontal field of view value, the vertical field of view value, and the one or more spatial frequency response values to the camera, wherein the camera includes memory that stores data characterizing the horizontal field of view value, the vertical field of view value, and the one or more spatial frequency response values.

In some implementations, determining the horizontal field of view and the vertical field of view include performing a de-mosaic operation on the one or images captured by the camera when the camera is directed at the first test target. In some implementations, determining the horizontal field of view value and the vertical field of view value includes determining a non-linear distortion coefficient using the one or images captured by the camera when the camera is directed at the first test target. In some implementations, the first test target includes one or patterns of a plurality of dot shapes and the second test target includes shapes that are straight and slanted relative to a vertical axis of the second test target. In some implementations, the operations further include: causing the camera test system to position the camera at another position relative to a third test target that includes a surface onto which collimated beams of light are projecting; and causing, when the camera is positioned at the other position relative to the third test target, the camera to capture one or more particular images of the surface onto which the collimated beams of light are projecting. In some implementations, the operations further include: generating, based on the one or more particular images, boresight data characterizing pitch, roll, and yaw of a boresight of the camera; and transmitting the boresight data to the camera, wherein the data stored by the camera includes the boresight data. In some implementations, the operations further include: causing the camera test system to position the camera at a particular position relative to a white light diffusing surface, which includes a layer of white material configured to diffuse white light that is projected onto the white material; and causing, when the camera is at the particular position relative to the white light diffusing surface, the camera to capture one or more particular images of the white light diffusing surface.

In some implementations, the operations further include: generating, based on the one or more particular images of the white light diffusing surface, auto-white balance data that corresponds to one or more ratios of pixel values of a portion of at least one image of the one or more particular images; and transmitting the auto-white balance data to the camera, wherein the data stored by the camera includes the auto-white balance data. In some implementations, the operations further include: causing the camera test system to position the camera at a particular position relative to at least one test system selected from an ingress protection test system, a flare and ghost test system, and a thermal protection test system; generating verification data based on at least an operation of the at least one test system; and transmitting the verification data to the camera, wherein the data stored by the camera includes the verification data.

In some implementations, a non-transitory computer readable storage medium is set forth as configured to store instructions that, when executed by one or more processors, cause the one or more processors to perform operations that include: processing, by a camera test system, one or more images captured by a camera that is directed at a first test target; generating, based on the processing, a horizontal field of view value that characterizes a horizontal field of view of the camera and a vertical field of view value that characterizes a vertical field of view of the camera; causing, based on determining the horizontal field of view value and the vertical field of view value, the camera test system to position the camera at a position relative to a second test chart; causing, when the camera is positioned at the position relative to the second test chart, the camera to capture one or more other images of the second test chart; generating, by the camera test system, one or more spatial frequency response values using at least the one or more other images of the second test chart; and transmitting, by the camera test system, the horizontal field of view value, the vertical field of view value, and the one or more spatial frequency response values to the camera, wherein the camera includes memory that stores data characterizing the horizontal field of view value, the vertical field of view value, and the one or more spatial frequency response values.

In some implementations, the operations further include: causing the camera test system to position the camera at another position relative to a third test target that includes a surface onto which collimated beams of light are projecting; and causing, when the camera is positioned at the other position relative to the third test target, the camera to capture one or more particular images of the surface on which the collimated beams of light are projected.

I claim:

1. A method implemented by one or more processors, the method comprising:
   processing, by a camera test system, one or more images captured by a camera that is directed at a first test target;
   generating, based on the processing, a horizontal field of view value that characterizes a horizontal field of view of the camera and a vertical field of view value that characterizes a vertical field of view of the camera;
   causing, based on determining the horizontal field of view value and the vertical field of view value, the camera test system to position the camera at a position relative to a second test chart;
   causing, when the camera is positioned at the position relative to the second test chart, the camera to capture one or more other images of the second test chart;

generating, by the camera test system, one or more spatial frequency response values using at least the one or more other images of the second test chart; and transmitting, by the camera test system, the horizontal field of view value, the vertical field of view value, and the one or more spatial frequency response values to the camera, wherein the camera includes memory that stores data characterizing the horizontal field of view value, the vertical field of view value, and the one or more spatial frequency response values.

2. The method of claim 1, wherein determining the horizontal field of view value and the vertical field of view value includes performing a de-mosaic operation on the one or images captured by the camera when the camera is directed at the first test target.

3. The method of claim 1, wherein determining the horizontal field of view value and the vertical field of view value includes determining a non-linear distortion coefficient using the one or images captured by the camera when the camera is directed at the first test target.

4. The method of claim 1, wherein the first test target includes one or patterns of a plurality of dot shapes and the second test chart includes shapes that are straight and slanted relative to a horizontal axis of the second test chart.

5. The method of claim 1, further comprising:

causing the camera test system to position the camera at another position relative to a third test target that includes a surface onto which collimated beams of light are projecting; and causing, when the camera is positioned at the other position relative to the third test target, the camera to capture one or more particular images of the surface onto which the collimated beams of light are projecting.

6. The method of claim 5, further comprising:

generating, based on the one or more particular images, boresight data characterizing pitch, roll, and yaw of a boresight of the camera; and transmitting the boresight data to the camera, wherein the data stored by the camera includes the boresight data.

7. The method of claim 1, further comprising:

causing the camera test system to position the camera at a particular position relative to a white light diffusing surface, which includes a layer of a white material configured to diffuse white light that is projected onto the white material; and causing, when the camera is at the particular position relative to the white light diffusing surface, the camera to capture one or more particular images of the white light diffusing surface.

8. The method of claim 7, further comprising:

generating, based on the one or more particular images of the white light diffusing surface, auto-white balance data that corresponds to one or more ratios of pixel values of a portion of at least one image of the one or more particular images; and transmitting the auto-white balance data to the camera, wherein the data stored by the camera includes the auto-white balance data.

9. The method of claim 1, further comprising:

causing the camera test system to position the camera at a particular position relative to at least one test system selected from an ingress protection test system, a flare and ghost test system, and a thermal protection test system;

generating verification data based on at least an operation of the at least one test system; and transmitting the verification data to the camera, wherein the data stored by the camera includes the verification data.

10. A system, comprising:

one or more processors; and memory storing instructions that, when executed by the one or more processors, cause the one or more processors to perform operations that include:

processing, by a camera test system, one or more images captured by a camera that is directed at a first test target;

generating, based on the processing, a horizontal field of view value that characterizes a horizontal field of view of the camera and a vertical field of view value that characterizes a vertical field of view of the camera;

causing, based on determining the horizontal field of view value and the vertical field of view value, the camera test system to position the camera at a position relative to a second test chart;

causing, when the camera is positioned at the position relative to the second test chart, the camera to capture one or more other images of the second test chart;

generating, by the camera test system, one or more spatial frequency response values using at least the one or more other images of the second test chart; and transmitting, by the camera test system, the horizontal field of view value, the vertical field of view value, and the one or more spatial frequency response values to the camera, wherein the camera includes memory that stores data characterizing the horizontal field of view value, the vertical field of view value, and the one or more spatial frequency response values.

11. The system of claim 10, wherein determining the horizontal field of view and the vertical field of view include performing a de-mosaic operation on the one or images captured by the camera when the camera is directed at the first test target.

12. The system of claim 10, wherein determining the horizontal field of view value and the vertical field of view value includes determining a non-linear distortion coefficient using the one or images captured by the camera when the camera is directed at the first test target.

13. The system of claim 10, wherein the first test target includes one or patterns of a plurality of dot shapes and the second test chart includes shapes that are straight and slanted relative to a vertical axis of the second test chart.

14. The system of claim 10, wherein the operations further include:

causing the camera test system to position the camera at another position relative to a third test target that includes a surface onto which collimated beams of light are projecting; and causing, when the camera is positioned at the other position relative to the third test target, the camera to capture one or more particular images of the surface onto which the collimated beams of light are projecting.

15. The system of claim 14, wherein the operations further include:

generating, based on the one or more particular images, boresight data characterizing pitch, roll, and yaw of a boresight of the camera; and transmitting the boresight data to the camera, wherein the data stored by the camera includes the boresight data.

16. The system of claim 10, wherein the operations further include:
   causing the camera test system to position the camera at a particular position relative to a white light diffusing surface, which includes a layer of a white material configured to diffuse white light that is projected onto the white material; and
   causing, when the camera is at the particular position relative to the white light diffusing surface, the camera to capture one or more particular images of the white light diffusing surface.

17. The system of claim 16, wherein the operations further include:
   generating, based on the one or more particular images of the white light diffusing surface, auto-white balance data that corresponds to one or more ratios of pixel values of a portion of at least one image of the one or more particular images; and
   transmitting the auto-white balance data to the camera, wherein the data stored by the camera includes the auto-white balance data.

18. The system of claim 10, wherein the operations further include:
   causing the camera test system to position the camera at a particular position relative to at least one test system selected from an ingress protection test system, a flare and ghost test system, and a thermal protection test system;
   generating verification data based on at least an operation of the at least one test system; and
   transmitting the verification data to the camera, wherein the data stored by the camera includes the verification data.

19. A non-transitory computer readable storage medium configured to store instructions that, when executed by one or more processors, cause the one or more processors to perform operations that include:
   processing, by a camera test system, one or more images captured by a camera that is directed at a first test target;
   generating, based on the processing, a horizontal field of view value that characterizes a horizontal field of view of the camera and a vertical field of view value that characterizes a vertical field of view of the camera;
   causing, based on determining the horizontal field of view value and the vertical field of view value, the camera test system to position the camera at a position relative to a second test chart;
   causing, when the camera is positioned at the position relative to the second test chart, the camera to capture one or more other images of the second test chart;
   generating, by the camera test system, one or more spatial frequency response values using at least the one or more other images of the second test chart; and
   transmitting, by the camera test system, the horizontal field of view value, the vertical field of view value, and the one or more spatial frequency response values to the camera, wherein the camera includes memory that stores data characterizing the horizontal field of view value, the vertical field of view value, and the one or more spatial frequency response values.

20. The non-transitory computer readable storage medium of claim 19, wherein the operations further include:
   causing the camera test system to position the camera at another position relative to a third test target that includes a surface onto which collimated beams of light are projecting; and
   causing, when the camera is positioned at the other position relative to the third test target, the camera to capture one or more particular images of the surface on which the collimated beams of light are projected.

* * * * *